United States Patent [19]

Reinhold

[11] Patent Number: 4,538,880

[45] Date of Patent: Sep. 3, 1985

[54] ELECTRODYNAMIC SCANNER AND STABILIZER

[75] Inventor: Ralph R. Reinhold, Huntsville, Ala.

[73] Assignee: The Boeing Company, Seattle, Wash.

[21] Appl. No.: 406,326

[22] Filed: Aug. 9, 1982

[51] Int. Cl.³ .......................... G02B 27/17; G02F 1/29
[52] U.S. Cl. ...................................... 350/6.6; 350/486
[58] Field of Search .......................... 350/6.6, 486, 487

[56] References Cited

U.S. PATENT DOCUMENTS

| | | | |
|---|---|---|---|
| 1,525,551 | 2/1925 | Jenkins | 350/486 |
| 2,419,999 | 5/1947 | Leck | 350/289 |
| 2,691,306 | 10/1954 | Beams et al. | 74/5.6 |
| 3,011,124 | 11/1961 | Herman et al. | 324/97 |
| 3,071,036 | 1/1963 | McKnight et al. | 350/6.9 |
| 3,386,786 | 6/1968 | Kaisler et al. | |
| 3,981,566 | 9/1976 | Frank et al. | 350/487 |
| 4,197,548 | 4/1980 | Smith et al. | 343/765 |

*Primary Examiner*—John R. Corbin
*Assistant Examiner*—Rebecca D. Gass
*Attorney, Agent, or Firm*—Edwin H. Crabtree

[57] ABSTRACT

An electrodynamic optical scanner and stabilizer for a pointer and tracker used on a seeking device. The seeking device used for air to air missiles, air to ground missiles, or any other use of a scanner requiring scanning speed and accuracy with the ability to generate different scanning patterns.

3 Claims, 5 Drawing Figures

ELECTRODYNAMIC SCANNER AND STABILIZER

BACKGROUND OF THE INVENTION

This invention relates to a device for optically scanning and achieving tracking resolution and stability and more particularly but not by way of limitation to a scanner and stabilizer using electrodynamic drivers connected to a processor control system which can generate different scanning patterns.

Heretofore, pointer and trackers used on a seeker are one of the more mechanically complex portions of the seeker. The electronic controls to nutate a spinning mass head are both complex and costly. A primary pointer and tracker can be made using low cost digital control technology provided a controllable secondary scanner can provide the scanning speed and accuracy necessary to meet the seeker design requirements. A number of techniques have been used in the past to provide pointing and tracking information. One of the more common techniques uses a torque driven gimbal system with a feedback loop between the torque motor controllers and the detected signal. This device requires the entire pointer and tracker or gimbal system be moved for minor changes in the position of the target.

Also a spinning mass seeker head is another approach which has been successfully used in the past. This device uses a free floating motor armature to provide seeker stabilization while the body to which it is attached is free to move. Changes in the field cause the armature to nutate or move in a desired path.

Current technology utilizing inside loop stability requires the use of costly torque motors or other high torque systems. These systems are used to take out the high frequency motion of the mounting platform. Scanning systems which involve the use of rotary mirrors or mirror assemblies or the electro-optical effect are also used in current seekers. All of the above mentioned devices are costly in both size, weight and in complexity of the mechanism and electronic drivers. These prior art devices do not have the ability to generate different scanning patterns through the use of a control system.

In U.S. Pat. No. 3,071,036 to McKnight et al., U.S. Pat. No. 4,197,548 to Smith et al., U.S. Pat. No. 1,525,551 to Jenkins, U.S. Pat. No. 2,419,999 to Leck, U.S. Pat. No. 2,691,306 to Beams et al., U.S. Pat. No. 3,011,124 to Hermann et al. and U.S. Pat. No. 3,386,786 to Kaisler et al. all disclose different types of refractive and reflective optics and scanning mirrors. None of these prior art devices described in the above mentioned patents specifically disclose the unique features of the subject electrodynamic optical scanner and stabilizer as described herein.

SUMMARY OF THE INVENTION

The subject electrodynamic scanner and stabilizer provides an operator of the device the ability to generate different types of scanning patterns such as conical, rosette, raster and others.

The scanner and stabilizer greatly reduces the cost and size of the seeker and reduces the complexity of the mechanism and electronic drivers used on the scanner and stabilizer.

Further the scanner and stabilizer has the ability through the use of electrodynamic drivers in combination with a flexible pivot attached to a reflector or emitter to derive complex seeking patterns which heretofore scanners and stabilizers were not able to provide.

The electrodynamic optical scanner and stabilizer for a pointer and tracker used on a seeking device includes a fixed mounting plate having a first electrodynamic driver and a second electrodynamic driver attached thereto. A control system having drive electronics and a feedback processor with position controller, pattern generator and system error signals are attached to the drivers through drive leads and position leads. The drivers and a flexible pivot are connected to a reflector through flexible mounts.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
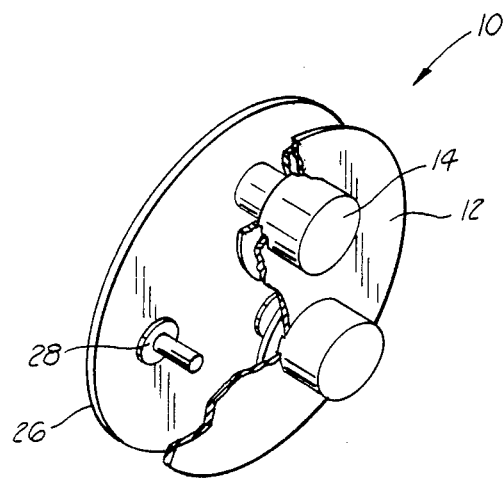
FIG. 1 illustrates a perspective view of an electrodynamic scanner and stabilizer.
Figure 2:
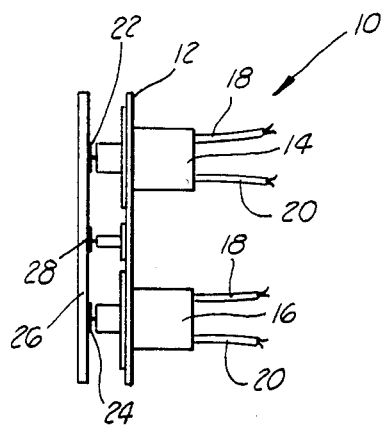
FIG. 2 is a side view of the electrodynamic scanner and stabilizer.

In FIG. 1 and FIG. 2 a perspective and a side view of the electrodynamic scanner and stabilizer is illustrated and designated by general reference numeral 10. The scanner and stabilizr 10 is attached to a fixed support which is not shown in the drawings through a mounting plate 12. A first electrodynamic driver 14 and a second electrodynamic driver 16 are attached to the mounting plate 12. Each of the drivers 14 and 16 include drive leads 18 and position leads 20. The drivers 14 and 16 also include flexible mounts 22 and 24. The mounts 22 and 24 are connected to a reflector 26. While a reflector 26 is discussed, it should be appreciated the reflector 26 could also be an emitter. The reflector 26 or emitter is also connected to a flexible pivot 28. Further, the reflector 26 is also connected to the flexible mounts 22 and 24 attached to the drivers 14 and 16.

Figure 3:
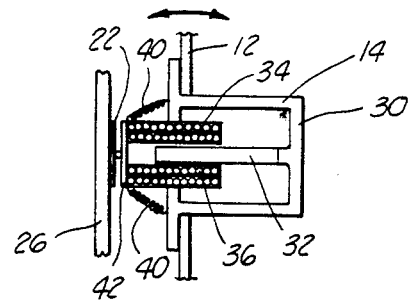
FIG. 3 is a side section view of an electrodynamic driver.

The electrodynamic driver 14 is shown in cross-section in FIG. 3. The driver 14 consists of a ferromagnetic housing 30 which serves as an assembly support and to close the magnetic path generated by a permanent magnet 32 mounted within the housing 30. A drive coil 34 is wound on the same axis as a position coil 36 and moves linearly with respect to the position coil 36 for moving the reflector 26 through the flexible mount 22. The drive coil 34 is held on center and restored to a neutral position with the use of restoring springs 40. A connecting plate 42 is provided for fastening the drive coil 34 to the flexible mount 22. The driver 16 is of the same construction as the drive 14 as described above.

Figure 4:
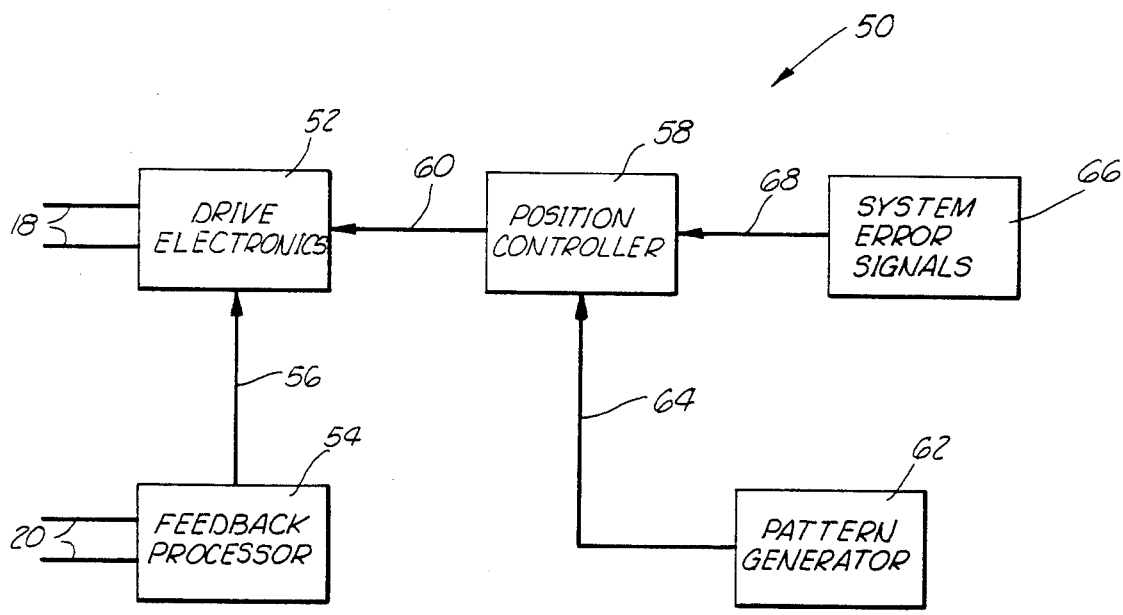
FIG. 4 is a flow diagram of the control system used for driving the electrodynamic drivers.

In FIG. 4 the drive leads 18 and position leads 20 are used to connect the scanner and stabilizer 10 to a control system designated by general reference numeral 50. The control system 50 includes drive electronics 52 which is connected to the electrodynamic drivers 14 and 16 through the leads 18. A feedback processor 54 is connected to the drive electronics 52 through a lead 56 with the processor 54 receiving signals via the position leads 20.

The drive electronics 52 is controlled by a position controller 58 via a lead 60. Errors in response to the position controller 58 are corrected with signals from the feedback processor 54. Signals for scan patterns are generated through a pattern generator 62 through lead 64 connected to the position controller 58. System error signals 66 are sent to the position controller 58 via lead 68. This particularly system uses the voltage generated by the second winding in the electrodynamic actuators for error signals. This voltage error is proportional to the rate of motion of the coil and therefore provides the drive system with an error signal proportional to the actual motion of the scanner. The error signals can be generated by sensors which are used to measure motion on the fixed support which is not shown in the drawings or from an external system. The error signals 66 and the pattern generator 62 are used by the position controller 58 to generate command signals which are fed to the drive electronics 52.

In addition to the implementation described under FIG. 1 through 4 and as shown in the drawings additional electrodynamic drivers may be used to increase the force available to provide for greater deflection of the reflector 26 or to allow for other simplified control schemes. Also a great variety of scan patterns can be used with the scanner and stabilizer 10 such as conical, rosette and raster among others.

For all identified scanning schemes the control signals are developed in a manner analogous to those used on a cathode ray tube. For a particular application, a conical scan is derived by feeding, for example, a sine wave signal to one axis and a cosine wave to the other axis. This produces a circular motion on the reflector 26 similar to a Lissajous circle on a cathode ray oscilloscope.

Figure 5:
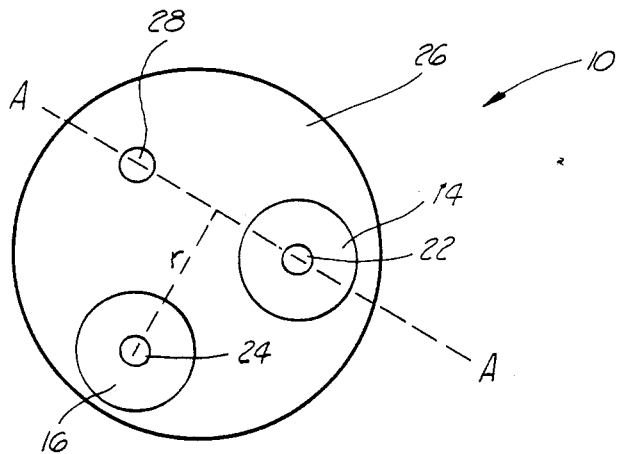
FIG. 5 is a front view of the electrodynamic scanner and stabilizer.

From reviewing FIG. 5 as an example, the scanner and stabilizer 10 may be operated wherein the drive signal displaces the electrodynamic drive 16 which is active while the electrodynamic drive 14 remains fixed. Therefore, the electrodynamic drive 16 rotates the reflector 26 about an axis of rotation A—A through the flexible pivot 28 and flexible mount 22. The reflector deflection ($\theta$) is derived as ($\theta$)=$d/r$ where d is the deflection of the electrodynamic drive 14 and r is the distance from the drive 16 to the axis A—A of rotation. Again, this is a particular example and it can be appreciated to those skilled in the use of scanners and stabilizers in a pointer and tracker system that through the unique features of the subject scanner and stabilizer 10 a great variety of both simple and complex scanning patterns can be developed which heretofore were not provided in prior art scanner and stabilizers.

Changes may be made in the construction and arrangement of the parts or elements of the embodiments as described herein without departing from the spirit or scope of the invention defined in the following claims.

What is claimed is:

1. An electrodynamic optical scanner and stabilizer for a pointer and tracker used on a seeking device, the scanner and stabilizer comprising:
    a mounting plate;
    a first electrodynamic driver attached to the mounting plate;
    a second electrodynamic driver attached to the mounting plate;
    control system means connected to the first and second electrodynamic drivers for driving the drivers through drive leads connected to the drivers and receiving position feedback of the drivers through position leads connected to the drivers;
    a flexible pivot attached to the mounting plate;
    flexible mounts attached to the drivers; and
    a reflector attached to the flexible pivot and the flexible mounts of the drivers, the drivers disposed in various predetermined positions adjacent the reflector for moving the reflector on the flexible pivot in a desired scanning pattern, such as conical, rosette and raster among others.

2. The scanner and stabilizer as described in claim 1 wherein the control system means includes drive electronics connected to the drive leads of the drivers and a feedback processor connector connected to the position leads of the drivers, the feedback processor connected to the drive electronics; a position controller connected to the drive electronics for generating position signals to the drive electronics and a pattern generator connected to the position controller for signaling the position controller and generating a desired pattern.

3. An electrodynamic optical scanner and stabilizer for a pointer and tracker used on a seeking device, the scanner and stabilizer comprising:
    a mounting plate;
    a first electrodynamic driver attached to the mounting plate;
    a second electrodynamic driver attached to the mounting plate, the drivers including a ferromagnetic housing having a drive coil and a position coil mounted therein, the drive coil disposed around the position coil with a permanent magnet mounted inside the position coil, when the driver is energized, the drive coil moving linearly in relationship to the position coil, the drive coil connected to a connecting plate;
    control system means connected to the first and second electrodynamic drivers for driving the drivers through drive leads connected to the drivers and receiving position feedback of the drivers through position leads connected to the drivers, the control system means having drive electronics connected to the drive leads and a feedback processor connected to the drive electronics and the position leads, the drive electronics controlled by signals from a position controller, the position controller connected to a pattern generator for receiving a desired scanning pattern command signal;
    a flexible pivot attached to the mounting plate;
    flexible mounts attached to the connecting plates of the drivers; and
    a reflector attached to the flexible pivot and the flexible mounts of the drivers, the drivers disposed in various predetermined positions adjacent the reflector for moving the reflector on the flexible pivot in a desired scanning pattern such as conical, rosette and raster among others.

* * * * *